Nov. 18, 1952  R. W. KERR ET AL  2,618,310
METHOD AND APPARATUS FOR MAKING LAMINATED ARTICLES
Filed May 4, 1950  2 SHEETS—SHEET 1
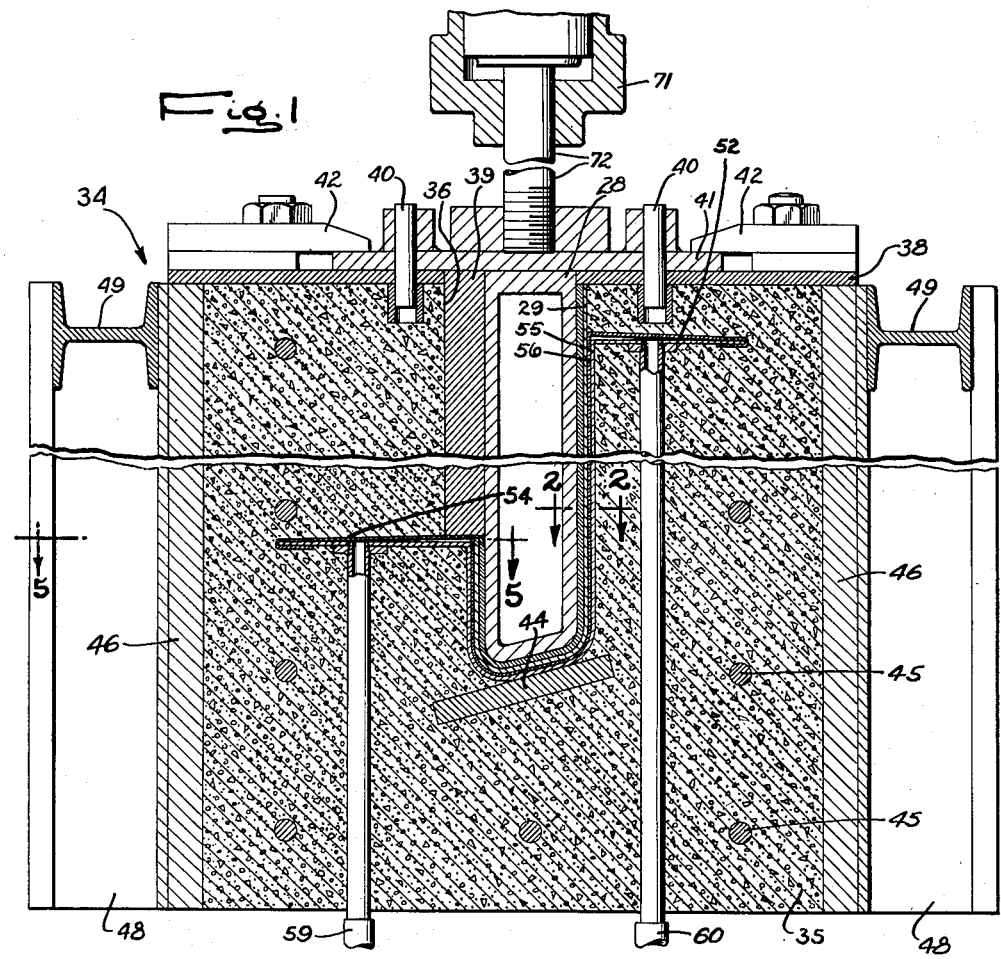
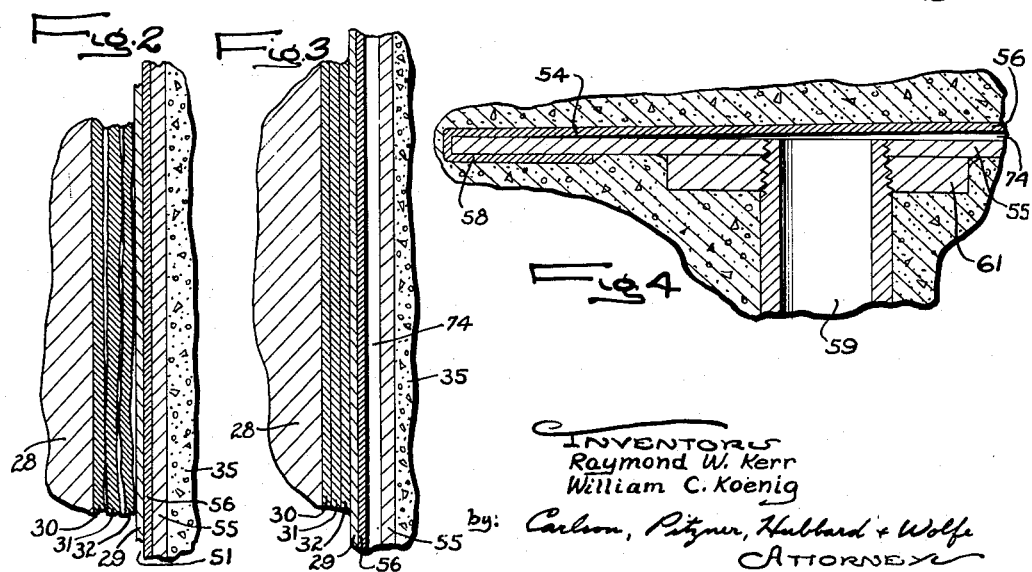
INVENTORS
Raymond W. Kerr
William C. Koenig
by: Carlson, Pitzner, Hubbard & Wolfe
ATTORNEYS

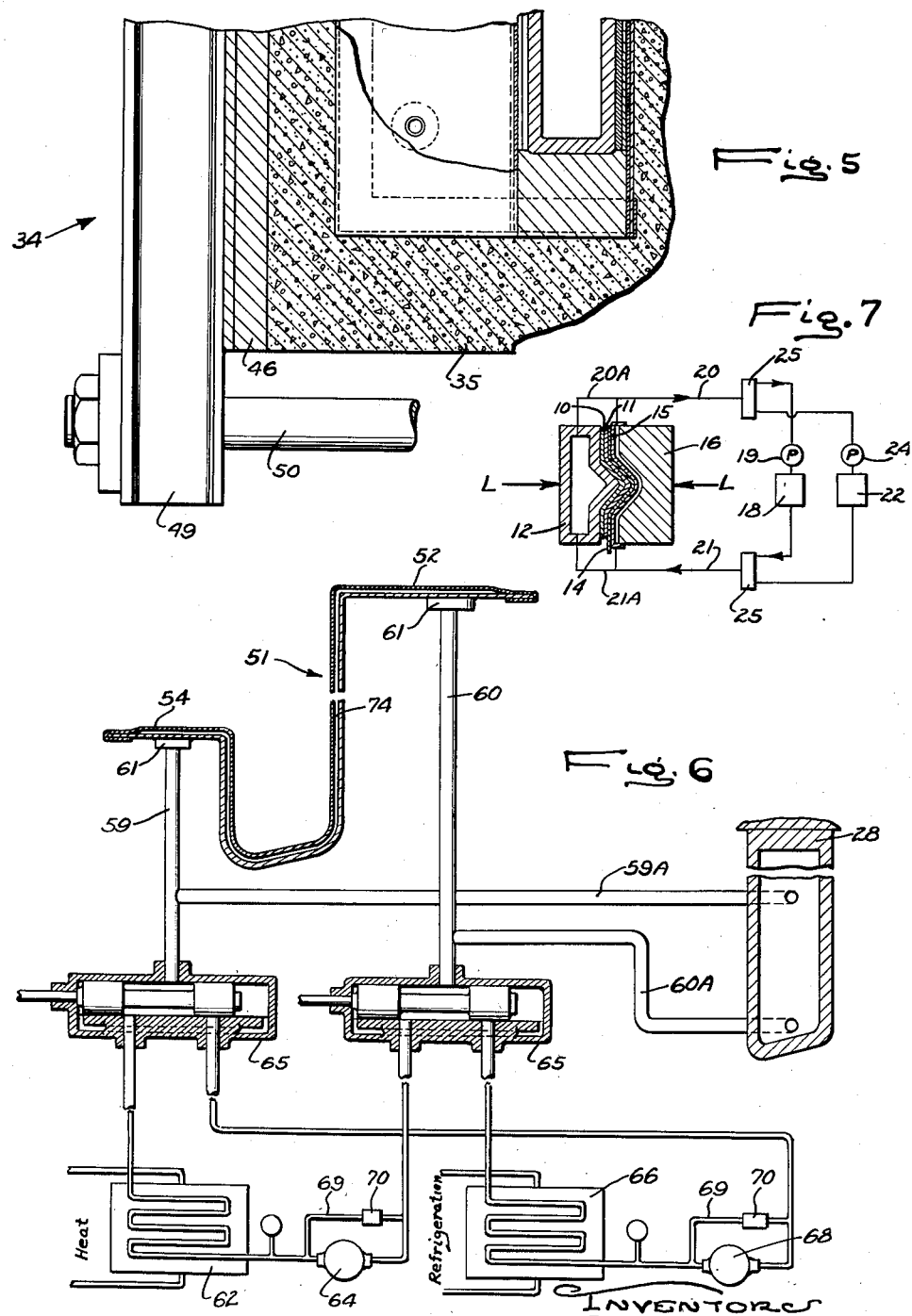

Patented Nov. 18, 1952

2,618,310

UNITED STATES PATENT OFFICE 2,618,310

METHOD AND APPARATUS FOR MAKING LAMINATED ARTICLES

Raymond W. Kerr and William C. Koenig, Hastings, Nebr.; said Koenig assignor to said Kerr Application May 4, 1950, Serial No. 160,066

2 Claims. (Cl. 154—1)

The present invention relates to the manufacture of laminated articles and more specifically to a novel method and apparatus for making laminates by bonding together two or more layers of fibrous material through the use of thermosetting or thermoplastic substances.

Laminates of this character have been produced commercially for a number of years by the use of conventional molds having compression dies which are frequently of massive proportions. The large size of such equipment has been due in most instances to the fact that it must withstand substantial applied pressures. Because of the mass of metal involved, a considerable time lag is introduced between successive heating and cooling cycles to which the laminate must be subjected and this of course tends to retard production. Certain other disadvantages in equipment of the foregoing type stem from attempts to apply pressure uniformly in more than one direction.

More recently, efforts have been made to produce laminates by means of fluid pressure molding equipment and without the use of ordinary compression dies. While such attempts have met with varying degrees of success, they are generally subject to rather limited ranges of temperature or pressure which, in turn, restrict the number and types of binding materials with which they may be used. These restrictions in many instances also limit the strength or quality of the finished laminate.

One object of the present invention is to provide a novel method for making laminated articles and which combines the advantages of conventional compression die molding with the advantages of more modern fluid pressure molding while at the same time eliminating certain inherent disadvantages of each.

Another object is to provide a method of the character set forth and which will permit the manufacture of laminates by the use of a wide variety of resins and the like heretofore unused commercially.

A further object is to provide a method of the foregoing type and which is susceptible of performance by means of relatively simple and low cost apparatus.

Another object is to provide novel apparatus having particular utility in connection with the practice of the method disclosed herein.

Still another object is to provide novel apparatus of the above type which will be economical to construct and maintain and at the same time will be susceptible of high production over a relatively long life span.

Other objects and advantages will become apparent in the light of the following detailed description taken in connection with the accompanying drawings, wherein:

Figure 1 is a vertical sectional view through illustrative apparatus embodying the present invention.

Figs. 2 and 3 are enlarged fragmentary horizontal sectional views taken in the plane of the line 2—2 in Fig. 1 and with the apparatus in an initial and an operative condition, respectively.

Fig. 4 is an enlarged fragmentary vertical sectional view through another portion of the apparatus of Fig. 1, the latter being in the operative condition indicated in Fig. 3.

Fig. 5 is a fragmentary horizontal sectional view through the apparatus of Fig. 1 and taken in the plane of the line 5—5.

Fig. 6 is a diagrammatic view illustrating an arrangement for controlling and circulating the pressurized fluid in the apparatus of Fig. 1.

Fig. 7 is a diagrammatic view illustrating the practice of the novel method disclosed herein.

While the invention is susceptible of various modifications and alternative constructions, certain preferred embodiments have been shown in the drawings and will be described below in considerable detail. It should be understood, however, that there is no intention to limit the invention to the specific form of method and apparatus disclosed, but on the contrary, the intention is to cover all modifications and alternative constructions falling within the spirit and scope of the invention as expressed in the appended claims.

In the practice of our novel method, two or more layers 10, 11 of fibrous material (see Fig. 7) such as paper or cloth are preferably coated or impregnated individually with an appropriate binding agent. The latter may, for example, comprise a synthetic resin of the thermosetting type although suitable thermoplastic resins can also be found. The layers 10, 11 are then stacked together and interposed between a support 12 having a smoothly finished surface, which defines one face of the finished laminate, and a smooth liner sheet 14 which defines the opposite face of the laminate. The support may be of metal or some other relatively hard substance capable of withstanding compression stresses. The liner sheet 14, on the other hand, may be made of thin sheet metal such as stainless steel and may be quite flexible, the primary requirement being that it have a surface of sufficient smoothness to impart a satisfactory finish to the surface of the laminate which it defines. The support 12, together with the uncured fibrous layers and the liner sheet 14, are then positioned relative to a flexible metallic diaphragm 15 so that the face of the latter will be abuttingly engaged by the face of the liner sheet remote from the support 12. The flexible metallic diaphragm 15 is, in turn, mounted in spaced relation to a second support 16 which may be formed of relatively hard material but need not possess a smooth surface.

To effect curing of the laminate under precisely controlled conditions of pressure and temperature, provision is made for injecting and circulating a heated and pressurized thermodynamic fluid through the space between the metallic diaphragm 15 and the support 16. The latter is of course constrained against movement away from the first support 12. This results in the application of heat and uniformly distributed pressure to the liner and the laminate, activating the binding agent so that it flows into the voids between the layers and within each individual layer. The foregoing may readily be accomplished as by means of a heating unit 18, a pump 19 and appropriate circulating conduits 20, 21. In instances where it is desired to apply heat to both sides of the laminate, the fluid may be circulated through an appropriate passage in the support 12 via branch conduits 20A, 21A respectively connected to the conduits 20, 21.

Provision is also made for completing the curing of the laminate by cooling the same under pressure after proper fusion has occurred. This is accomplished by abrutly interrupting the flow of heated pressure fluid through the space between the metallic diaphragm 15 and the support 16 and through the support 12, and thereupon circulating cooled pressure fluid through such space between the diaphragm and the support 16 and through the support 12. In furtherance of such objective, we may provide a cooling unit 22 and a pump 24 connecting with quick-acting transfer valves 25 interposed between respective ones of the conduits 20, 21 and the source of heated pressure fluid 18, 19. The foregoing action is particularly advantageous for certain types of resins having relatively high melting points and which do not achieve their full physical strength unless cooled or cured under a considerable amount of pressure.

For the purpose of facilitating the molding of laminates having contours which include relatively sharp radii, we have discovered that it is advisable to supplement the compression produced by the metallic diaphragm by urging the supports 12, 16 together under an externally applied auxiliary mechanical load L. This auxiliary load is preferably maintained during both heating and cooling of the laminate and makes for clearer definition of the sharply curved portions of the surface of the laminate.

Turning now to Fig. 1, there is shown one form of apparatus by means of which our method may be practiced. In the present instance, such apparatus is adapted to produce trough-shaped laminated articles such as moldings and trim for window frames. As shown, the apparatus comprises a first support in the form of a force or male die member 28 which may be of hollow and generally rectangular construction. The force 28 may be of cast metallic construction and has a smooth exterior surface finished as by plating and polishing for defining one face of the laminate. Operatively associated with the force 28 and dimnesioned so that it can be positioned in spaced relation with respect thereto is a floating liner in the form of a substantially U-shaped trough-like member 29 preferably of relatively thin stainless steel sheeting. The trough-like liner 29 is adapted to telescope over the force 28 and to sandwich between the latter and itself a plurality of layers of impregnated fibrous material 30, 31, 32. These layers may, for example, be sheets of heavy paper impregnated with a synthetic resin of the thermosetting type.

To receive the force 28 together with the trough-shaped liner 29 and the layers of impregnated paper 30, 31, 32, there is provided a second support or reaction member in the form of a female die member 34 of substantial but relatively inexpensive construction. In the present instance, the member 34 comprises a reinforced concrete body 35 having a central cavity 36 of appropriate size to accommodate the force 28, the uncured laminate and the liner 29. Overlying the top of the body 35 is a landing pad 38 having a central aperture which registers with the force 28 and a spacer plate 39 also housed within the cavity 36. The landing pad 38 includes suitably spaced holes for accommodating the guide or roughing pins 40 of hold-down shoe 41 which secures the force and spacer plate in position within the cavity 36. Releasable clamping means such as adjustable fingers 42 may be used to maintain the hold-down shoe 41 in place. The member 34 is reinforced internally by means of stiffener plate 44 and reinforcing rods 45 imbedded in the concrete body 35. External reinforcement against the compression stresses within the cavity 36 is provided by a series of structural members. These may include shell plates 46 located on the right-hand and left-hand sides of the member 34 as viewed in Fig. 1. The plates 46 are reinforced in the instant case by means of vertically extending I-beams 48 and horizontally extending I-beams 49. The latter have overhanging end portions which are engaged by relatively heavy tie bolts 50 extending horizontally between opposite sides of the member 34 (see Fig. 5).

Nested within the cavity 36, and telescopically engaging the face of the trough-shaped liner 29 remote from the force 28, is an expansible metallic member in the form of an envelope 51. As indicated in the drawings, the envelope 51 is of trough-like shape and has outturned flanges 52, 54 extending from either of its sides. The expansible metallic envelope in the present instance comprises a heavy back-up plate 55 together with a relatively thin flexible metallic diaphragm 56 of sheet copper or the like overlying the plate 55. The diaphragm has a reversely bent marginal portion 58 overlapping the plate 55 and brazed or otherwise sealed to the latter so as to form a fluidtight joint therewith (Figs. 1, 4 and 6).

Where the apparatus is employed to produce laminates with relatively smooth unbroken contours, the diaphragm 56 and back-up plate 55 may be fashioned on an ordinary metal break. For producing articles with complex contours, including small radii of curvature, the diaphragm and even the backing plate may be fabricated by an electroplating or electroforming operation.

Means is provided for injecting a pressurized and heated thermodynamic fluid such as oil into the interior of the envelope 51 and for circulating such fluid therethrough to activate the binding agent and compress the laminate under precisely controlled conditions of temperature and pressure. This is accomplished by connecting one fluid conduit 59 to one of the outturned flanges of the envelope 51 and by connecting another fluid conduit 60 to the opposite one of such flanges. For this purpose, the back-up plate 55 is formed with orifices of proper diameter each reinforced in the vicinity of its periphery as by means of an internally threaded boss 61. Heated pressure fluid is supplied from a combined reservoir and heating unit 62 and a pump 64 which discharges into the conduit 59 via the heater 62, the suction side of the pump being connected to the other conduit 60. Where desired, the heated pressure fluid may also be circulated as by means of branch conduits 59A and 60A through the hollow interior of the force 28 which serves as a fluid passage.

Means is also provided for abruptly interrupting the flow of heated pressure fluid and thereupon circulating cooled pressure fluid through the envelope 51 and the force 28 to effect cooling of the laminate under pressure. This is accomplished by interposing quick-acting transfer valves 65 (Fig. 6) between the conduits 59, 60 and the pump 64 and heater 62. At the same time, one of the valves 65 is connected to the discharge side of a fluid cooling unit 66 and its associated pump 68, while the other valve 65 is connected to the suction side of the unit and pump 66, 68. To protect the pumps 64, 68 during actuation of the transfer valves 65, each of the pumps is provided with a recirculating line 69 and a relief valve 70. The valves 65, which may be of the piston type, are susceptible of simultaneous actuation and preferably have a mid-position wherein they block the entry of any pressure fluid into the conduits 59, 60 and relieve the pressure within the envelope 51 and force 28.

To supplement the pressurizing action of the envelope 51 so that relatively sharp radii may be formed with fidelity in the contour of the laminate, we provide means for applying an auxiliary mechanical load between the force 28 and the female die member 34. Referring once more to Fig. 1, there is shown a convenient expedient for developing such an auxiliary mechanical load. Accordingly, one or more hydraulic actuators 71 may be connected as by means of piston rod 72 to the hold-down shoe 41. The application of fluid pressure from any suitable source to the actuator 71 exerts a downward compressive load upon the shoe 41 which, in turn, transmits the same to the force 28. This load, of course, may be applied as long as it is needed.

While the operation of the apparatus described above will no doubt be already apparent to those skilled in the art, a brief synopsis might be helpful at this point. To begin with, the layers of fibrous material 30, 31, 32, which have been coated or impregnated with a suitable binding agent, are interposed between the force 28 and the trough-shaped floating liner 29. This assembly is thereupon inserted into the cavity 36 of the female die member 34, the liner 29 nesting against the adjacent face of the flexible diaphragm of the expansible metallic envelope 51. The spacer block 39 and landing pad 38 are thereupon mounted in the position indicated in Fig. 1 after which the hold-down shoe 41 is mounted in place and secured by the fingers 42. With the transfer valves 65 in the condition indicated in Fig. 6, pressure fluid supplied by the heater 62 and pump 64 is injected into pocket 74 of the envelope 51 and circulated therethrough. At the same time, the fluid is circulated through the force 28 via branch conduits 59A, 60A. The circulation of heated pressure fluid through the pocket 74 results in the application of a substantially uniformly distributed pressure upon the flexible diaphragm 56 and the floating liner 29. This squeezes the layers 30, 31, 32 tightly together as indicated in Fig. 3, activating the binding agent and making it flow into all the voids between the layers and into the interstices of the individual layers after a sufficient period of time. The action of the pressure fluid is supplemented by the auxiliary mechanical load on the force 28 produced by the actuator 71. After the proper time interval, the pistons of both transfer valves 65 are shifted to the right (as viewed in Fig. 6). This immediately interrupts the flow of heated pressure fluid and initiates circulation of cooled pressure fluid through the envelope 51 and the force 28, such fluid being supplied by the unit 66 and the pump 68. After the elapse of a sufficient period of time to properly cool the laminate, the transfer valves may be shifted to mid-position releasing the pressure fluid from the envelope 51 and the force 28 and blocking the admission of pressure fluid to the conduits 59, 60 from either the heater 62 or the cooling unit 66. The hold-down shoe 41 can be removed and the force, laminate, and liner extracted from the cavity 36.

Upon reflection, it will be appreciated that the method and apparatus disclosed herein possess a number of important commercial advantages in addition to those already set forth. First of all, since the masses of metal surrounding the laminate are relatively small, the inertia or heat lag in the die members is negligible. Consequently, the apparatus is capable of performing each curing cycle with exceptional rapidity and with such cycles spaced in close succession. Moreover, the apparatus is capable of operating with ease at pressures as high as 1,000 pounds per square inch and temperatures as high as 600° F. During such severe operating conditions, the diaphragm is well protected since it is constrained against excessive deflection and its movement remains well within its elastic limit. In addition, the use of a single fluid medium for controlling both temperature and pressure, and the circulation of such medium, renders the equipment susceptible of extremely precise and sensitive control.

We claim as our invention:

1. Apparatus for simultaneously thermo-processing and pressure-forming heat-sensitive laminae into objects having a predetermined configuration, said apparatus comprising, in combination, a die member defining a finished forming surface, a reaction member movable relative to said die member into and out of interengagement therewith, said reaction member defining a reaction surface thereon complemental to said forming surface and having a substantially uniform spacing therefrom, a thin metallic envelope having a portion thereof conforming generally in size and shape with said reaction surface and nested in contiguous overlying relation thereto; said envelope comprising a metal backing sheet disposed adjacent said reaction surface and a thin metallic diaphragm of flexible construction disposed in contiguous, generally coextensive relation to said backing plate; the peripheral edge of said diaphragm being sealed to said backing plate in a fluid-tight manner, said envelope defining a fluid inlet and a fluid outlet therein spaced from each other and communicating with the interstice between said diaphragm and said plate, a surface forming liner conforming generally in configuration to said forming surface and interposed between said die member and said envelope; said liner being of a metallic construction and defining a second finished forming surface complemental to said first-mentioned forming surface and disposed in spaced, facing relation thereto; and pressure fluid supply means interconnected with said envelope inlet and outlet for circulating therethrough hot pressurized fluid followed by cold pressurized fluid.

2. Apparatus for simultaneously thermo-processing and pressure-forming heat-sensitive laminae into objects having a predetermined irregular shaping, said apparatus comprising, in combination, a female die member, a male die member movable relative to said female die member into and out of nested relation thereto, one of said die members defining a finished forming surface of predetermined irregular configuration, the other of said die members defining a reaction surface thereon complemental to said forming surface and having a substantially uniform spacing therefrom, a thin metallic envelope having a portion thereof conforming generally in size and shape with said reaction surface and nested in contiguous overlying relation thereto; said envelope comprising a metal backing sheet disposed adjacent said reaction surface and a thin metallic diaphragm of flexible construction disposed in contiguous, overlying relation to said backing plate; the peripheral edges of said diaphragm being sealed to said backing plate in a fluid-tight manner, said envelope defining a fluid inlet and a fluid outlet therein spaced from each other and communicating with the interstice between said diaphragm and said plate, a surface forming liner conforming generally in configuration to said forming surface and interposed between said one die member and said envelope, said liner being of a metallic construction and defining a second finished forming surface complemental to said first-mentioned forming surface and disposed in spaced facing relation thereto, an actuator interconnected with one of said die members for mechanically forcing said male die member into said female die member under substantial load, and pressure fluid supply means interconnected with said envelope inlet and outlet for circulating therethrough hot pressurized fluid followed by cold pressurized fluid.

RAYMOND W. KERR.
WILLIAM C. KOENIG.

REFERENCES CITED

The following references are of record in the file of this patent:

UNITED STATES PATENTS

| Number | Name | Date |
|---|---|---|
| 1,365,267 | Oakley | Jan. 11, 1921 |
| 2,276,035 | Guhl | Mar. 10, 1942 |
| 2,337,250 | Klassen | Dec. 21, 1943 |
| 2,363,107 | Young | Nov. 21, 1944 |
| 2,385,083 | Kemerer | Sept. 18, 1945 |
| 2,433,965 | Upson | Jan. 6, 1948 |
| 2,466,735 | Piazze | Apr. 12, 1949 |